(12) United States Patent
Matsumoto

(10) Patent No.: US 12,204,703 B2
(45) Date of Patent: *Jan. 21, 2025

(54) ELECTRONIC PEN

(71) Applicant: Wacom Co., Ltd., Saitama (JP)

(72) Inventor: Yoshiharu Matsumoto, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,362

(22) Filed: Mar. 15, 2024

(65) Prior Publication Data

US 2024/0220036 A1    Jul. 4, 2024

Related U.S. Application Data

(63) Continuation of application No. 18/339,023, filed on Jun. 21, 2023, now Pat. No. 11,960,664, which is a
(Continued)

(30) Foreign Application Priority Data

Dec. 28, 2020  (JP) .................................. 2020-218390

(51) Int. Cl.
 *G06F 3/0354*  (2013.01)
 *H01F 27/24*  (2006.01)
(Continued)

(52) U.S. Cl.
 CPC ......... *G06F 3/03545* (2013.01); *H01F 27/24* (2013.01); *H01F 27/306* (2013.01); *H01F 38/14* (2013.01); *H01F 2038/143* (2013.01)

(58) Field of Classification Search
 CPC .. G06F 3/03545; G06F 3/046; G06F 3/04162; G06F 3/044; G06F 3/0416;
(Continued)

(56) References Cited

U.S. PATENT DOCUMENTS

2011/0219892 A1    9/2011  Fukushima et al.
2013/0199311 A1    8/2013  Horie et al.
(Continued)

FOREIGN PATENT DOCUMENTS

JP    2011186803 A    9/2011
JP    2013161307 A    8/2013
(Continued)

OTHER PUBLICATIONS

International Search Report, mailed Dec. 21, 2021, for International Application No. 1 PCT/JP2021/036726. (2 pages) (English translation).

*Primary Examiner* — Dong Hui Liang
(74) *Attorney, Agent, or Firm* — Seed IP Law Group LLP

(57) ABSTRACT

Provided is an electronic pen which communicates with a position detection sensor through electromagnetic induction, including a coil, a columnar magnetic core including a through hole in an axial direction of the magnetic core, a capacitor constituting a resonant circuit together with the coil, and a rod-shaped core body inserted through the through hole of the magnetic core, in which the magnetic core includes a front portion, a back portion, and a middle portion interposed between the front portion and the back portion, an outside diameter of the middle portion is smaller than an outside diameter of the front portion of the magnetic core and an outside diameter of the back portion of the magnetic core, and the coil is wound around the middle portion of the magnetic core.

8 Claims, 5 Drawing Sheets

Related U.S. Application Data continuation of application No. PCT/JP2021/036726, filed on Oct. 5, 2021.

(51) Int. Cl.
*H01F 27/30* (2006.01)
*H01F 38/14* (2006.01)

(58) Field of Classification Search
CPC .... G06F 3/041; G06F 3/0488; G06F 3/04883; G06F 2200/1632; G06F 1/169; G06F 1/1658; G06F 1/1643; G06F 1/1683; G06F 2203/04106; H01F 7/0294; H01F 38/14; H01F 27/24; H01F 27/28
See application file for complete search history.

(56) References Cited

U.S. PATENT DOCUMENTS

| | | |
|---|---|---|
| 2015/0035764 A1 | 2/2015 | Michihata et al. |
| 2016/0077843 A1 | 3/2016 | Jakoboski et al. |
| 2017/0357340 A1 | 12/2017 | Kamiyama et al. |
| 2017/0361639 A1 | 12/2017 | Kaneda et al. |
| 2018/0081458 A1 | 3/2018 | Horie et al. |
| 2019/0025951 A1 | 1/2019 | Kamiyama et al. |

FOREIGN PATENT DOCUMENTS

| | | |
|---|---|---|
| JP | 2017224178 A | 12/2017 |
| WO | WO 2017183526 A1 | 10/2017 |

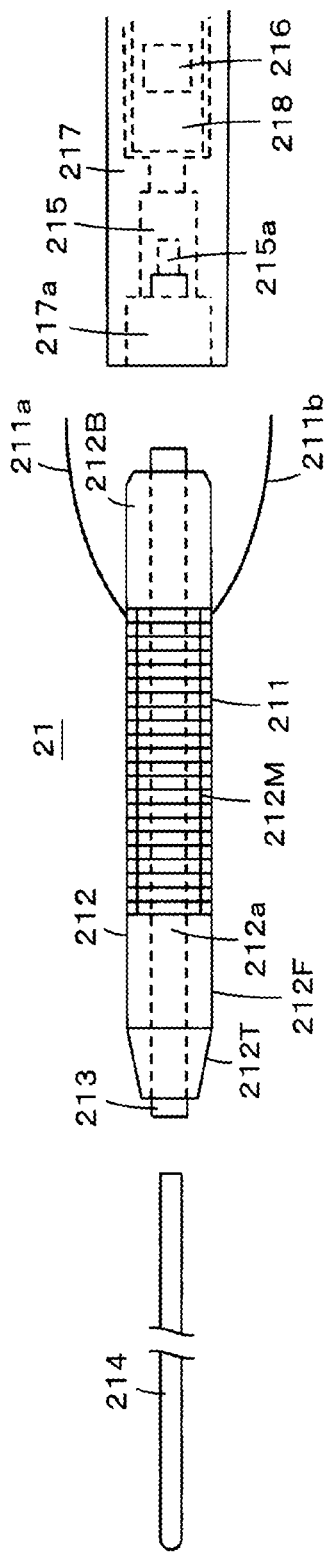
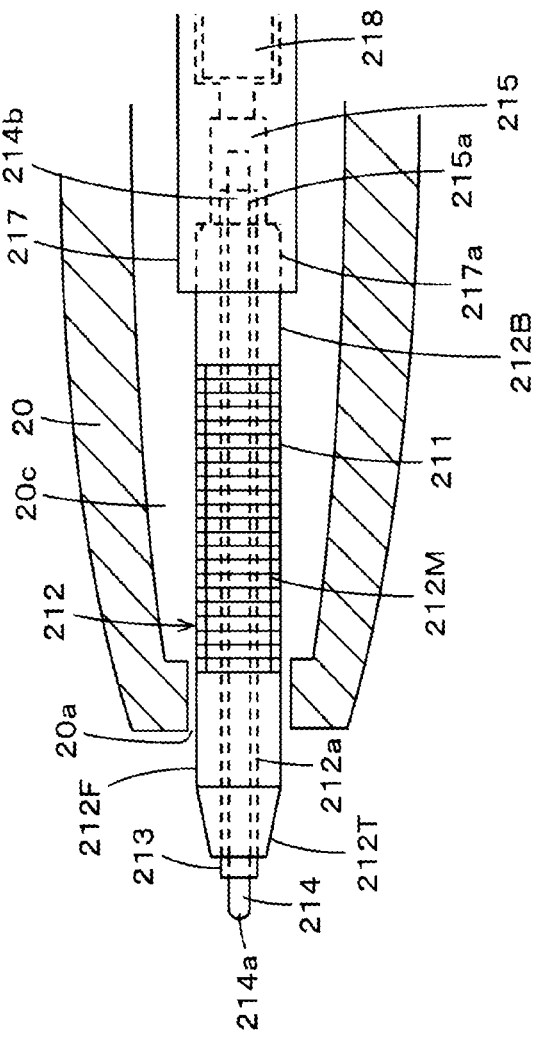
FIG. 2A
FIG. 2B

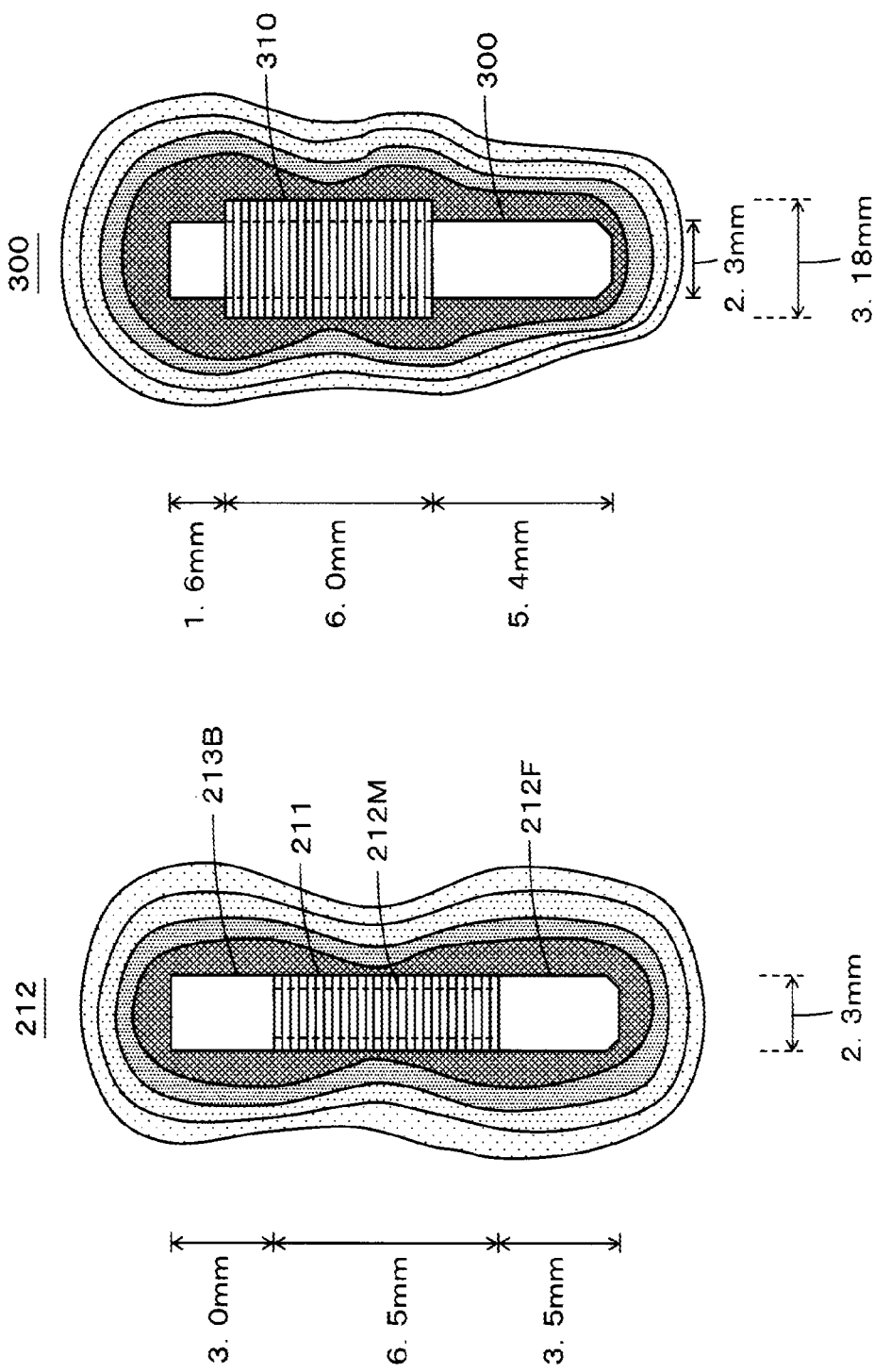

ELECTRONIC PEN

BACKGROUND

Technical Field

The present disclosure relates to an electronic pen that is a pen-type position indicator used with a position detection device.

Description of the Related Art

An electronic pen is held by a user and used to indicate the position on a sensor of a position detection device. Since the electronic pen includes, for example, a circuit board mounted therein, the electronic pen is thicker than typical writing instruments such as ballpoint pens and fountain pens. However, since electronic devices such as what are generally called tablet personal computers (PCs) and high-performance mobile phone terminals called smartphones including position detection devices have become smaller and thinner, there has been a demand for thinner electronic pens.

Hence, Japanese Patent Laid-Open No. 2017-224178 (Patent Document 1), which is described later, discloses an disclosure related to an electronic pen body that has a size similar to that of a ballpoint pen refill (replacement core) and that can be used by being mounted in an existing ballpoint pen housing. Further, PCT Patent Publication No. WO2017/183526 (Patent Document 2), which is described later, discloses an disclosure related to an electronic pen whose strength is increased to the extent that a pen tip, which is likely to be subjected to external pressure, is not bent or broken even if the electronic pen is made thinner.

For example, an electromagnetic induction system and a capacitance system are available for a position input device including an electronic pen and a position detection device. In the case of an electronic pen of the electromagnetic induction system, a coil for constituting a resonant circuit together with a capacitor needs to be disposed on the pen tip side to exchange a magnetic signal with a position detection device of the electromagnetic induction system. Further, in the case of an electronic pen of the capacitance system, for example, a coil connected to a battery mounted in the electronic pen may be disposed on the pen tip side of the electronic pen to charge the battery wirelessly, and the battery may be charged through electromagnetic induction (magnetic field coupling).

In these cases, the coil is formed by an insulated conductor being wound around a magnetic core. This is because the magnetic core has an effect of increasing the impedance of the insulated conductor according to its magnetization and suppressing the propagation of noise current flowing through the coil. However, since the coil is formed by the insulated conductor being wound around the magnetic core, a portion where the coil of the electronic pen is formed inevitably becomes thick as illustrated in, for example, FIG. 3 of Patent Document 1 and FIGS. 3 and 7 of Patent Document 2.

In recent years, there has been an increasing demand for further thinner electronic pens including coils. For example, there is a demand for electronic pens thinner than before so that they can easily be housed in housings of mobile terminals. There is also a demand for further thinner electronic pens in order to more easily mount an electronic pen function as one of functions of what is generally called a multicolor pen (multifunctional pen).

BRIEF SUMMARY

In light of the abovementioned circumstances, an object of the present disclosure is to provide a further thinner electronic pen without deteriorating functions of the electronic pen.

There is provided an electronic pen which communicates with a position detection sensor through electromagnetic induction, the electronic pen including a coil, a columnar magnetic core including a through hole in an axial direction of the magnetic core, a capacitor constituting a resonant circuit together with the coil, and a rod-shaped core body inserted through the through hole of the magnetic core, in which the magnetic core includes a front portion in a predetermined range from a front end of the magnetic core on a pen tip side of the magnetic core toward a back end of the magnetic core on a side of the magnetic core opposite to the pen tip side of the magnetic core, a back portion in a predetermined range from the back end of the magnetic core toward the front end of the magnetic core, and a middle portion interposed between the front portion and the back portion, an outside diameter of the middle portion of the magnetic core toward is smaller than an outside diameter of the front portion of the magnetic core and the back portion of the magnetic core, and the coil is wound around the middle portion of the magnetic core.

The electronic pen includes the columnar magnetic core, and the magnetic core includes the through hole and has three portions: the front portion, the middle portion, and the back portion. The outside diameter of the middle portion is smaller than the outside diameters of the front portion and the back portion, so that the magnetic core has a shape in which the middle portion is thinner, resembling what is generally called a dumbbell that is a gymnastic instrument. Since the coil is formed by an insulated conductor being wound around the middle portion, a portion of the magnetic core around which the coil is wound does not become thick, and this configuration can contribute to making an electronic pen thin.

BRIEF DESCRIPTION OF THE SEVERAL VIEWS OF THE DRAWINGS

FIGS. 2A and 2B are views for describing an example of a configuration of a portion of the electronic pen according to the embodiment of the present disclosure;

FIGS. 4A and 4B are diagrams for describing a magnetic flux distribution of a portion including the ferrite core of the electronic pen according to the embodiment of the present disclosure and a magnetic flux distribution of a portion including a ferrite core of a conventional electronic pen;

DETAILED DESCRIPTION

Figure 1:
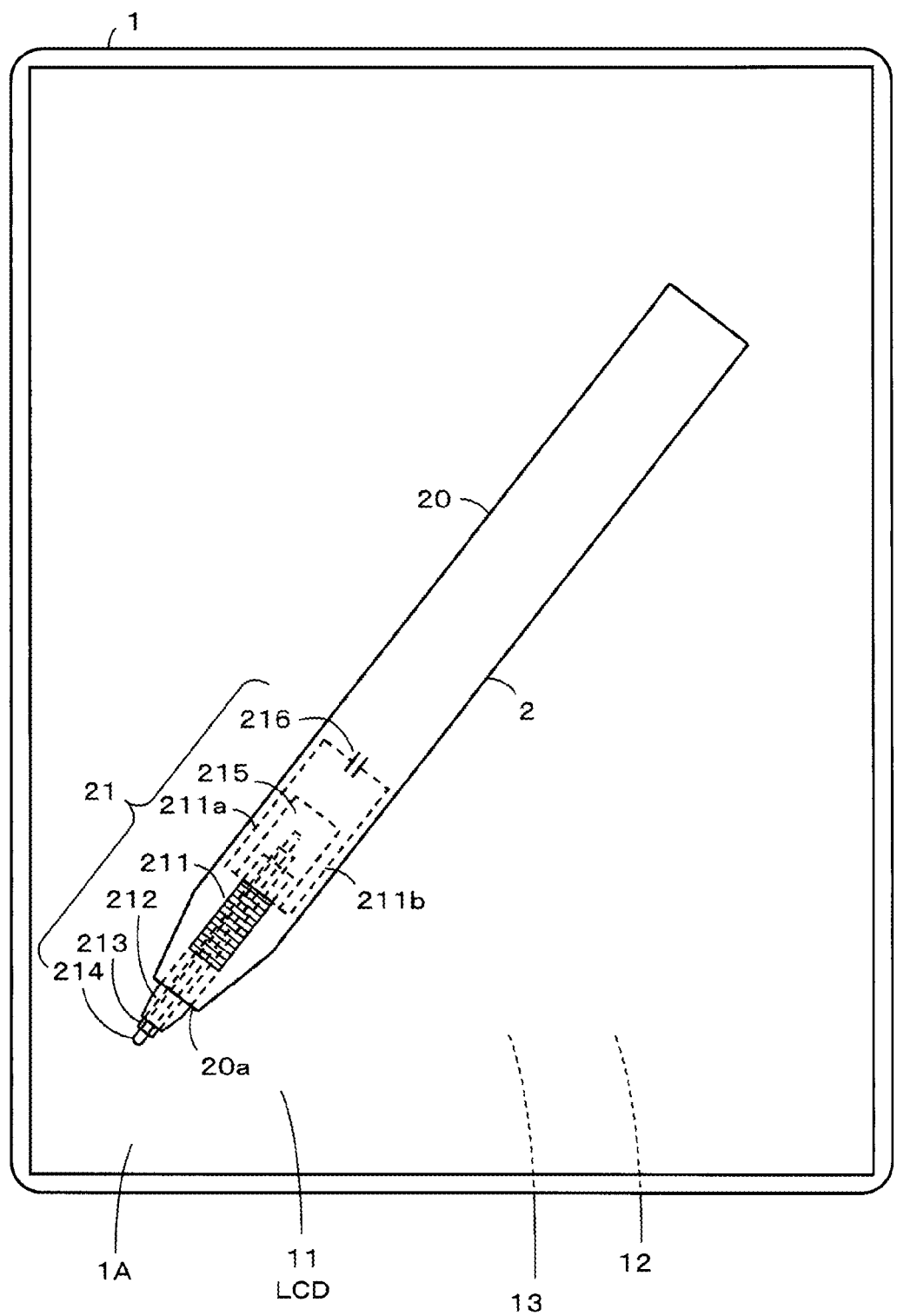
FIG. 1 is a view for describing an electronic pen according to an embodiment of the present disclosure and a tablet terminal where the electronic pen is used.

An electronic pen according to an embodiment of the present disclosure is described below with reference to the drawings. For example, an electromagnetic induction system and a capacitance system are available as a position detection system employed by electronic pens and position detection sensors. In the electromagnetic induction system (electro magnetic resonance (EMR) system), a position detection device includes a sensor in which a plurality of loop coils are arranged in each of an X-axis direction and a Y-axis direction. The position detection device alternates between a transmission period and a reception period. In the transmission period, power is sequentially supplied to the plurality of loop coils of the sensor to generate a magnetic field. In the reception period, the power supply stops, and a magnetic field is received from outside. A corresponding electronic pen includes a resonant circuit including a coil and a capacitor. Current flowing through the coil in response to the magnetic field from the sensor generates a signal. The electronic pen then transmits the signal including pen pressure information to the sensor. The position detection device receives this signal during the reception period and detects the position indicated by the electronic pen and pen pressure of the electronic pen.

In the capacitance system, a position detection device includes a sensor in which a plurality of linear conductors (line electrodes) are arranged in each of an X-axis direction and a Y-axis direction. The sensor detects the indicated position according to a change in capacitance (electric charge) generated in the linear conductors when a finger or a capacitance pen is brought close to the sensor. A capacitance pen may be a pen-type position indicator having conductivity or what is generally called an active capacitance pen (using an active electrostatic (AES) system) that is driven by a battery and transmits a signal. In the case of the active capacitive coupling system using the active capacitance pen, an electronic pen transmits a signal from an oscillation circuit mounted in the electronic pen together with pen pressure information, and the position detection device receives the signal including the pen pressure information and detects the indicated position and pen pressure.

The active capacitance pen basically needs no coil mounted therein. However, when the mounted battery is charged by non-contact charging, a coil may be mounted for charging. The present disclosure is applicable to electronic pens that need to mount a coil therein. Hence, the electronic pen according to the present disclosure is applicable to both an electronic pen of the electromagnetic induction system and an electronic pen (active capacitance pen) of the active capacitive coupling system that performs non-contact charging. In the embodiment described below, the case where the present disclosure is applied to an electronic pen of the electromagnetic induction system in which a coil is a main constituent component is first described as an example.

Example of Configuration of Tablet Terminal 1

FIG. 1 is a view for describing an electronic pen 2 according to an embodiment and a tablet terminal 1 where the electronic pen 2 is used. The tablet terminal 1 includes, for example, a liquid crystal display (LCD) 11 as a display device and has a configuration in which a relatively large display screen 1A of the LCD 11 is exposed on the front. For example, protective glass or the like is disposed on the display screen 1A. A position detection sensor 12 and a position detection device 13 are disposed on a back side of the display screen 1A. The position detection sensor 12 includes a detection region corresponding to the entire surface of the display screen 1A such that any position indicated by the electronic pen 2 on the display screen 1A can be detected. The position detection device 13 controls the position detection sensor 12 and detects the indicated position and pen pressure in reference to an output signal from the position detection sensor 12.

As described above, the position detection sensor 12 is configured by stacking an X-axis direction sensor and a Y-axis direction sensor. The X-axis direction sensor includes a plurality of loop coils arranged in an X-axis direction (lateral direction). The Y-axis direction sensor includes a plurality of loop coils arranged in a Y-axis direction (longitudinal direction). The position detection device 13 can perform control so as to alternate between the transmission period in which power is sequentially supplied to the plurality of loop coils of the position detection sensor 12 to generate a magnetic field and the reception period in which the power supply stops and a magnetic field is received from outside. The position detection device 13 detects the indicated position and pen pressure in reference to the signal received during the reception period.

Although not illustrated, a motherboard is mounted inside a housing of the tablet terminal 1. Various circuits such as a display control circuit, an information processing circuit, and a communication processing circuit and memories are mounted in the motherboard to enable various information processes. Further, although not illustrated, some operation buttons such as a power button are disposed on a side surface of the housing of the tablet terminal 1 to accept an operation input from a user and allow processing corresponding to the accepted operation to be performed.

Assume that a position indication operation is performed by the electronic pen 2 on the display screen 1A of the tablet terminal 1. In this case, the position detection device 13 identifies the indicated position on the display screen 1A in reference to the detection output from the position detection sensor 12, which is disposed on the back side of the display screen 1A. Information indicating the indicated position identified by the position detection device 13 is supplied to the information processing circuit mounted in the tablet terminal 1, and processing corresponding to the information is performed accordingly.

Example of Configuration of Electronic Pen 2

As described above, the electronic pen 2 transmits and receives signals to and from the position detection sensor 12 of the position detection device 13 of the tablet terminal 1 with use of the electromagnetic induction system, to allow the position detection device 13 of the tablet terminal 1 to detect the position indicated by the electronic pen 2. A mechanical configuration of the electronic pen 2 can have a similar configuration to that of an electronic pen of a known electromagnetic induction system, except that the shape of a magnetic core of the electronic pen 2 is characteristic.

As illustrated in FIG. 1, the electronic pen 2 according to the present embodiment includes an electronic pen body 21 on an opening 20a side in an axial direction in a hollow portion of a cylindrical housing 20, which is, for example, made of resin. The electronic pen body 21 includes a coil 211, a magnetic core, in this example, a ferrite core 212 around which the coil 211 is wound, a reinforcement pipe 213, a core body 214, a pen pressure detector 215, and a capacitor 216, which constitutes a resonant circuit together with the coil 211. The housing 20 is illustrated thick in FIG. 1 in order to clearly illustrate the configuration of a main portion. However, since the electronic pen body 21 is formed thin, the electronic pen 2 is formed thinner than a conventional electronic pen in actual implementation.

FIGS. 2A and 2B are views for describing an example of a configuration of the electronic pen body 21. As illustrated in FIG. 2A, the ferrite core 212 is, for example, formed of a circular columnar ferrite material and has a through hole 212a formed in the axial direction. The through hole 212a into which the reinforcement pipe 213 described later is inserted has a predetermined diameter r1 (e.g., r1=0.91 mm). As described in detail later, the ferrite core 212 includes three portions, i.e., a front portion 212F, a middle portion 212M, and a back portion 212B, from a pen tip side toward a back end in the axial direction.

An outside diameter of the middle portion 212M is smaller than the outside diameters of the front portion 212F and the back portion 212B. In this way, the thickness of the middle portion 212M is smaller than the thicknesses of the front portion 212F and the back portion 212B, so that the overall shape of the ferrite core 212 resembles the shape of a dumbbell that is a gymnastic instrument. With this configuration, although the coil 211 is formed by an insulated conductor being wound around the middle portion 212M, the outside diameter of a portion where the coil 211 is formed is not larger (thicker) than the outside diameters of the front portion 212F and the back portion 212B.

Further, a tapered portion 212T, which gradually tapers, is formed on a pen tip side of the front portion 212F of the ferrite core 212. With this configuration, magnetic coupling between the position detection device 13 and the position detection sensor 12 becomes stronger than that when the tapered portion 212T is not provided. The outside diameter of the front portion 212F excluding the tapered portion 212T and the outside diameter of the back portion 212B have the same length. Accordingly, the portion including the ferrite core 212 and the coil 211 has a substantially constant outside diameter at any portion in the axial direction, except for the tapered portion 212T, as illustrated in FIG. 2A.

As illustrated in FIGS. 1 and 2A, the reinforcement pipe 213 is disposed in the through hole 212a of the ferrite core 212 in the electronic pen body 21. The reinforcement pipe 213 is, for example, formed of stainless steel such as SUS316 and has an outside diameter slightly smaller than an inside diameter of the through hole 212a of the ferrite core 212. As illustrated in FIG. 2A, the reinforcement pipe 213 is fixed from one end to the other end of the through hole 212a of the ferrite core 212. A front end of the reinforcement pipe 213 protrudes from an opening at a front end of the ferrite core 212. A back end of the reinforcement pipe 213 protrudes from an opening at a back end of the ferrite core 212. Thus, the length of the reinforcement pipe 213 in the axial direction is greater than the length of the ferrite core 212 in the axial direction, as illustrated in FIG. 2A.

A cylindrical body portion 217, which is, for example, made of resin, is disposed at the back end of the ferrite core 212. The pen pressure detector 215 is disposed in the vicinity of a portion where the cylindrical body portion 217 is coupled to the ferrite core 212. The pen pressure detector 215 has a configuration using a semiconductor element, as disclosed in, for example, Japanese Patent Laid-Open No. 2013-161307, in which the capacitance varies according to the pen pressure. Note that the pen pressure detector 215 may have a configuration of a variable capacitor whose capacitance changes according to the pen pressure and that uses pen pressure detection means having a well-known mechanical configuration as described in, for example, Japanese Patent Laid-Open No. 2011-186803.

A printed circuit board 218 is also housed in the cylindrical body portion 217. The capacitor 216, which is connected in parallel to the coil 211 and constitutes a resonant circuit, is disposed in the printed circuit board 218. A variable capacitor including the pen pressure detector 215 is connected in parallel to the capacitor 216, which is disposed on the printed circuit board 218 and constitutes part of the resonant circuit described above.

As illustrated in FIG. 2B, the back end of the back portion 212B of the ferrite core 212 is fitted into a recessed portion 217a, which is formed in the cylindrical body portion 217. Accordingly, the ferrite core 212 is coupled to the cylindrical body portion 217. Although not illustrated, when the ferrite core 212 is coupled to the cylindrical body portion 217, extension wires 211a and 211b extending from both ends of the coil 211 are connected in parallel to the capacitor 216, which is disposed on the printed circuit board 218 of the cylindrical body portion 217.

In the present embodiment, the core body 214 has a rod shape with a diameter smaller than an inside diameter of a hollow portion (through hole) inside the reinforcement pipe 213, which is inserted through the through hole 212a of the ferrite core 212. The length of the core body 214 in the axial direction is greater than the length of the reinforcement pipe 213 in the axial direction. In the present embodiment, as illustrated in FIG. 2B, the core body 214 is inserted through the hollow portion of the reinforcement pipe 213, which is inserted through the through hole 212a of the ferrite core 212, and a tail end 214b of the core body 214 is fitted into a fitting hole 215a of the pen pressure detector 215. In this fitting state, a pen tip of the core body 214 protrudes from an opening at the front end of the reinforcement pipe 213.

In the present embodiment, as illustrated in FIG. 2B, a pen tip 214a of the core body 214 externally protrudes from the opening 20a of the housing 20 of the electronic pen 2, together with part of the reinforcement pipe 213 on the pen tip side and part of the ferrite core 212 on the pen tip side. Hence, the pen pressure applied to the pen tip 214a of the core body 214 is directly transmitted to the pen pressure detector 215 through the core body 214.

The resonant circuit of the electronic pen 2 according to the present embodiment receives an alternating-current (AC) signal of a frequency f0 transmitted through the position detection sensor 12 of the position detection device 13, through electromagnetic induction coupling. Then, the resonant circuit of the electronic pen 2 feeds back the received AC signal to the position detection sensor 12 through electromagnetic induction coupling. The position detection device 13 detects the position indicated by the electronic pen 2, by detecting the position of the AC signal fed back from the electronic pen 2 on the position detection sensor 12. Further, the position detection device 13 detects the pen pressure applied to the electronic pen 2, by detecting a change in the frequency or phase of the AC signal received from the electronic pen 2.

In order to satisfactorily perform the interaction of the AC signal between the electronic pen 2 and the position detection sensor 12 while reducing energy loss as much as possible, the resonant frequency of the resonant circuit of the electronic pen 2 is selected in such a manner as to be equal to the frequency f0 of the AC signal from the position detection device 13.

Configuration of Ferrite Core

Figure 3A:
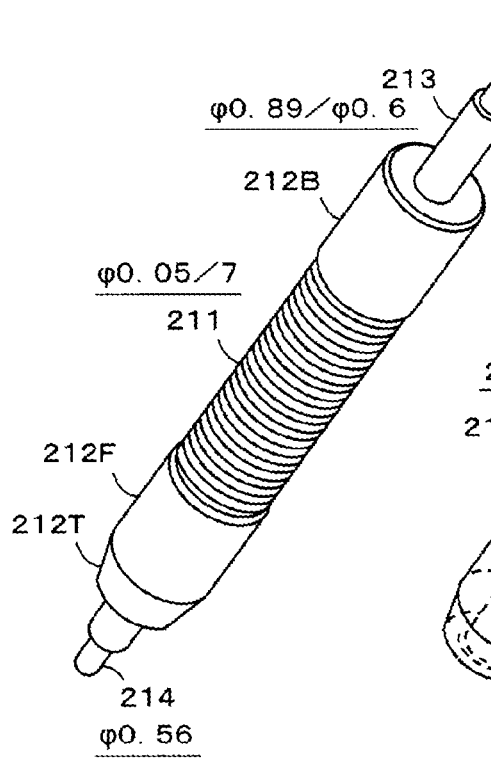
FIGS. 3A to 3C are views for describing a configuration of a portion including a ferrite core of the electronic pen according to the embodiment of the present disclosure.
Figure 3B:
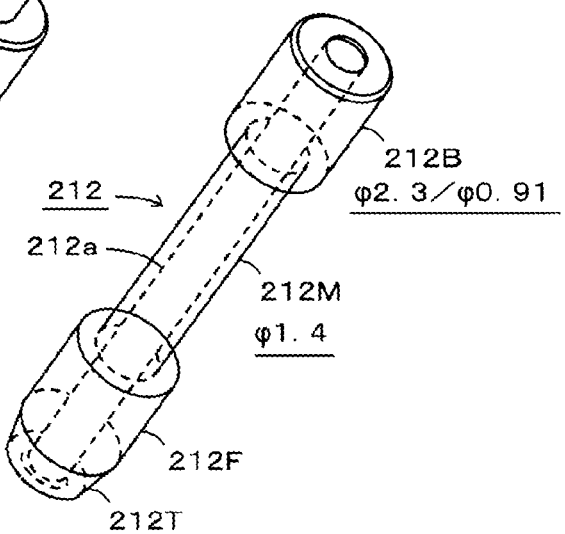
Figure 3C:
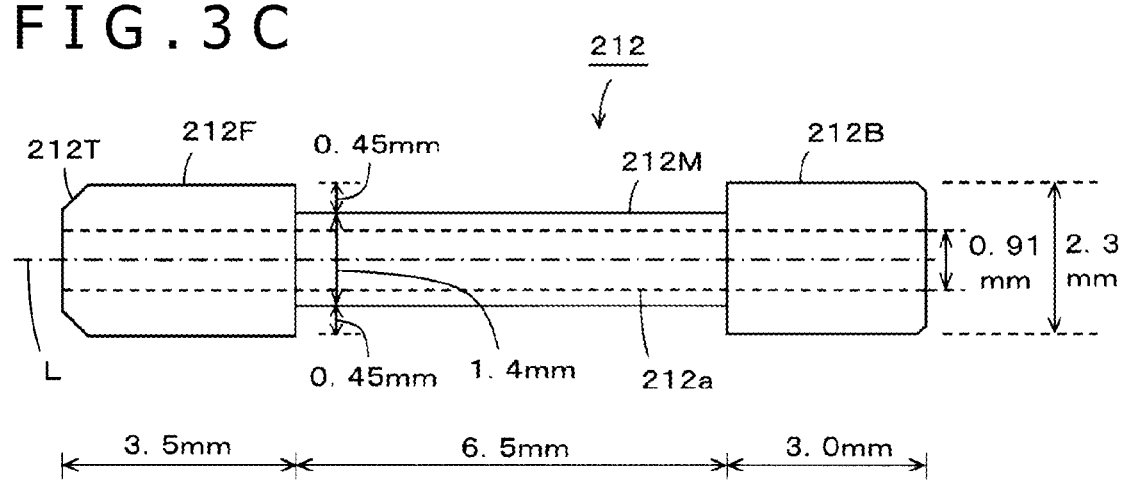

FIGS. 3A to 3C are views for describing the configuration of the ferrite core 212 portion of the electronic pen 2 according to the embodiment. Specifically, FIG. 3A is a perspective view of the ferrite core 212 portion with the coil 211, the reinforcement pipe 213, and the core body 214 attached. FIG. 3B is a perspective view of the ferrite core 212 only. FIG. 3C is an external view of the ferrite core 212 viewed from a direction intersecting the axial direction (longitudinal direction).

Each of the coil 211, the ferrite core 212, the reinforcement pipe 213, and the core body 214 can be of various sizes. However, in the electronic pen 2 according to the present embodiment, the shape and size of the ferrite core 212 are devised such that the outside diameter of the portion including the coil 211, the ferrite core 212, the reinforcement pipe 213, and the core body 214 has the same size as that in the 4C standard which is the standard for ballpoint pen refills, and the sizes of the other parts are also selected accordingly.

Considering the tolerance, the outside diameter $\varphi$ is within the range of 2.3 mm to 2.4 mm in the 4C standard. Hence, in the following description, the outside diameter $\varphi$ of the portion including the coil 211, the ferrite core 212, the reinforcement pipe 213, and the core body 214 corresponds to the outside diameter in the 4C standard and is substantially 2.3 mm. Further, although the term "substantially" is omitted in the description regarding the lengths, such as the outside diameters, of other portions, there are cases where the tolerance is included and the length is substantially the described length.

The ferrite core 212 is a magnetic body made of ferrite (ceramics including iron oxide as a main component). As illustrated in FIG. 3B, the ferrite core 212 has a circular columnar shape and includes the through hole 212a with an axis serving as a center line. Further, as illustrated in FIGS. 3B and 3C, the ferrite core 212 includes three portions: the front portion 212F, the middle portion 212M, and the back portion 212B. The tapered portion 212T, which has a tapered shape, is disposed on the pen tip side of the front portion 212F.

In the present embodiment, the outside diameter $\varphi$ of the front portion 212F of the ferrite core 212 and the outside diameter $\varphi$ of the back portion 212B of the ferrite core 212 are both substantially 2.3 mm, while the outside diameter $\varphi$ of the middle portion 212M is 1.4 mm. That is, the outside diameter of the middle portion 212M is 0.9 mm smaller than the outside diameters of the front portion 212F and the back portion 212B, so that the overall shape of the ferrite core 212 resembles a dumbbell. The inside diameter $\varphi$ of the ferrite core 212 (the diameter of the through hole 212a) is 0.91 mm at any of the front portion 212F, the middle portion 212M, and the back portion 212B.

As illustrated in FIG. 3A, an insulated conductor is wound around the middle portion 212M of the ferrite core 212 having the shape described above, to form the coil 211. In the present embodiment, the coil 211 is formed using a stranded wire ($\varphi$0.05/7) formed with seven conductors each having a diameter $\varphi$ of 0.05 mm twisted together. Hence, the diameter of the stranded wire is approximately 0.15 mm. Even if the stranded wire is doubly wound around the middle portion 212M, such as 26 turns in the first layer (first stage) and 24 turns in the second layer (second stage), the thickness of the coil 211 is approximately 0.3 mm.

Accordingly, even if the coil 211 is formed by an insulated conductor being wound around the middle portion 212M of the ferrite core 212, the outside diameter of the portion where the coil 211 is formed is not larger than the outside diameter (substantially 2.3 mm) of the front portion 212F or the back portion 212B where the coil is not formed. That is, the outside diameter at any position of the portion including the coil 211 and the ferrite core 212 is substantially 2.3 mm or less. As described above, the reinforcement pipe 213 is made of stainless steel (SUS316) and has an outside diameter $\varphi$ of 0.89 mm and an inside diameter $\varphi$ of 0.6 mm, as illustrated in FIG. 3A. The core body 214 is made of resin such as polyacetal (POM) and has a diameter $\varphi$ of 0.56 mm.

With these portions, as illustrated in FIG. 3A, the reinforcement pipe 213 is inserted through the through hole 212a of the ferrite core 212 around which the coil 211 is wound, and the core body 214 is inserted through the hollow portion of the reinforcement pipe 213. In this way, a portion of the electronic pen body 21 on the pen tip side is configured. The reinforcement pipe 213 reinforces not only the core body 214 but also the ferrite core 212, thereby increasing the strength of the constituent components of the electronic pen body 21 on the pen tip side to which an external pressure is applied.

The shape and size of the ferrite core 212 according to the present embodiment are summarized with reference to FIG. 3C. The ferrite core 212 has a circular columnar shape with an outside diameter of substantially 2.3 mm and includes the through hole 212a having a diameter of 0.91 mm with the axis serving as a center line L. The total length of the ferrite core 212 is 13 mm. Specifically, the ferrite core 212 includes the front portion 212F with a length of 3.5 mm, the middle portion 212M with a length of 6.5 mm, and the back portion 212B with a length of 3.0 mm. The tapered portion 212T is formed at the front end of the front portion 212F.

As illustrated in FIG. 3C, the middle portion 212M has an outside diameter of 1.4 mm, which is 0.9 mm smaller than the outer diameters of the front portion 212F and the back portion 212B. Hence, in between the middle portion 212M and the front and back portions 212F and 212B, there is a step of 0.45 mm across the entire circumference, creating a 0.9 mm difference in the outside diameter. Accordingly, as described above, even if the stranded wire ($\varphi$0.05/7), which is an insulated conductor, is doubly wound around the middle portion 212M, the thickness of the coil 211 is approximately 0.3 mm. Therefore, the electronic pen body 21 can be configured to have the outside diameter (substantially 2.3 mm) conforming to the 4C standard, which is the standard for ballpoint pen refills, without the outside diameter of the middle portion 212M around which the coil 211 is wound exceeding substantially 2.3 mm.

FIGS. 4A and 4B are diagrams for describing the magnetic flux distribution (FIG. 4A) of a portion including the ferrite core 212 of the electronic pen 2 according to the present embodiment and the magnetic flux distribution (FIG. 4B) of a portion including a ferrite core 300 of a conventional electronic pen. FIGS. 4A and 4B illustrate only the ferrite core and the coil, omitting the description of the core body and the other portions. The ferrite core 300 of the conventional electronic pen illustrated in FIG. 4B has a circular columnar shape with a length of 13 mm in the axial direction and an outside diameter of substantially 2.3 mm at any position in the axial direction.

In this case, if the coil is wound around the pen tip side of the ferrite core 300 of the conventional electronic pen, the coil becomes an obstacle, preventing a front end of a core body and a front end of the ferrite core 300 from protruding from a housing of the electronic pen whose pen tip side has a tapered shape. Hence, as illustrated in FIG. 4B, in the case of the ferrite core 300 of the conventional electronic pen, a coil 310 is formed by an insulated conductor being wound farther on the back side. In the case of the example illustrated in FIG. 4B, a non-wound portion with a length of 5.4 mm is provided from the front end of the ferrite core 300 on the pen tip side to the side of the back end, and then a coil is formed over a length of 6.0 mm. Then, a non-wound portion with a length of 1.6 mm is provided.

Hence, in order to generate a desired magnetic flux (magnetic field) on the pen tip side, it is necessary to increase the self-inductance (L value). As such, in the case of the conventional electronic pen, it is necessary to wind the coil around the ferrite core 300, for example, triply or more, and the outside diameter of the portion where the coil is wound is as thick as approximately 3.18 mm in the case of FIG. 4B. As a result, as illustrated in FIG. 4B, a desired magnetic flux can be generated on the pen tip side. However, since the coil 310 is formed on the back end side of the ferrite core 300, a magnetic flux (magnetic field) generated on the back end side of the ferrite core 300 is larger than that on the pen tip side in the conventional electronic pen.

By contrast, in the case of the ferrite core 212 of the electronic pen 2 according to the present embodiment illustrated in FIG. 4A, as described with reference to FIG. 3C, the outside diameter of the front portion 212F and the outside diameter of the back portion 212B are both substantially 2.3 mm, while the outside diameter of the middle portion 212M is 1.4 mm. Further, as illustrated in FIG. 4A, the front portion 212F of the ferrite core 212 corresponds to a portion with a length of 3.5 mm from the front end on the pen tip side to a side of the back end. The middle portion 212M corresponds to a portion with a length of 6.5 mm following the front portion 212F. The back portion 212B corresponds to a portion with a length of 3.0 mm following the middle portion 212M.

In the case of the electronic pen 2 according to the present embodiment, the insulated conductor is doubly wound around the middle portion 212M having the length of 6.5 mm, thereby forming the coil 211. As described above, the coil 211 is formed of the insulated conductor that is a stranded wire (φ0.05/7), and the diameter of the stranded wire is approximately 0.15 mm. Hence, even if the insulated conductor is doubly wound to form the coil, the thickness thereof is approximately 0.3 mm. Accordingly, the outside diameter of the portion where the coil is formed is substantially 2.3 mm or less. Thus, in the case of the electronic pen 2 according to the present embodiment, the outside diameter of the ferrite core 212 portion including the portion where the coil 211 is formed is substantially 2.3 mm or less.

Moreover, as illustrated in FIG. 4A, the coil 211 can be positioned on the pen tip side of the ferrite core 212. Hence, a desired magnetic flux can be generated on the pen tip side merely by the insulated conductor being doubly wound around the middle portion 212M to form the coil 211. Further, in the case of the electronic pen 2 according to the present embodiment, the coil 211 can be formed in a substantially central portion of the ferrite core 212, so that the magnetic flux (magnetic field) that is substantially equal between the pen tip side and the back end side of the ferrite core 212 can be generated. Therefore, an unnecessarily large magnetic flux (magnetic field) is not generated on the back end side of the electronic pen 2.

Figure 5:
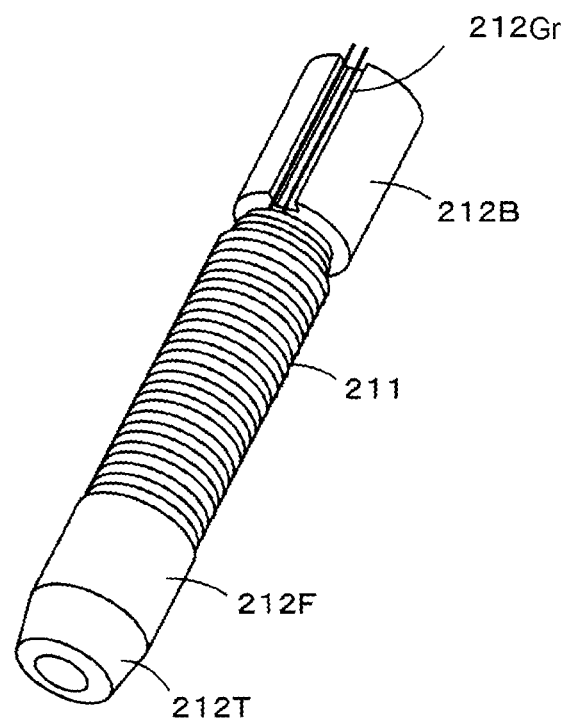
FIG. 5 is a view for describing a groove formed in the ferrite core of the electronic pen according to the embodiment of the present disclosure.

FIG. 5 is a view for describing a groove formed in the ferrite core 212 of the electronic pen 2 according to the present embodiment. As described above, the extension wires 211a and 211b extending from both ends of the coil 211, which is wound around the ferrite core 212, are connected in parallel to the capacitor 216, which is disposed on the printed circuit board 218. Accordingly, a groove 212Gr is formed along the axial direction on a side surface of the back portion 212B of the ferrite core 212 such that the extension wires 211a and 211b, which extend from both ends of the coil 211, can appropriately be extended to the back end. As a result, the extension wires 211a and 211b do not appear on the side surface of the ferrite core 212 but pass through the groove 212Gr, which is formed on the side surface of the ferrite core 212, and can be extended to the printed circuit board 218 at a subsequent stage.

Application to Electronic Pen of Active Capacitance System

Figure 6:
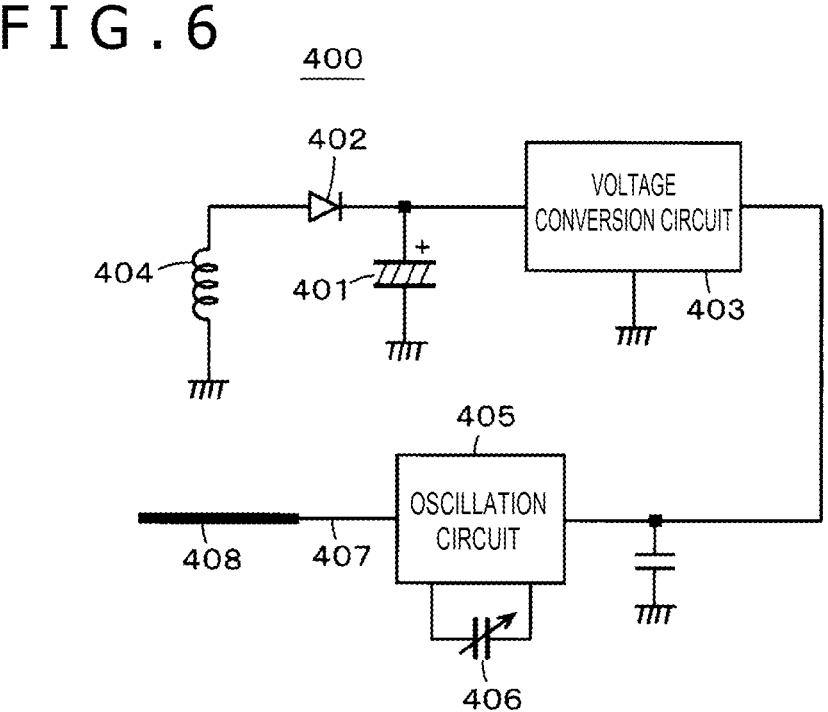
FIG. 6 is a diagram for describing an example of a configuration when the electronic pen according to the embodiment of the present disclosure is applied to an electronic pen of an active capacitance system.

FIG. 6 is a diagram for describing an example of a configuration when the electronic pen according to the present disclosure is applied to an electronic pen (active capacitance pen) of an active capacitance system. An active capacitance pen 400 in this example includes an electric double layer capacitor 401, which functions as a power storage unit, a rectifying diode 402, a voltage conversion circuit 403, and a coil 404 for charging. The active capacitance pen 400 further includes an oscillation circuit 405, a pen pressure detector 406, a signal line 407, and a conductive core body 408.

In this example, one end of the coil 404 is connected to an anode of the rectifying diode 402, while the other end of the coil 404 is grounded (GND). Further, one end of the electric double layer capacitor 401 is connected to a cathode of the rectifying diode 402, while the other end of the electric double layer capacitor 401 is grounded. The coil 404 does not constitute a resonant circuit for position indication through electromagnetic induction but is used as a supply end of a power source for receiving power source from outside, realizing a non-contact charging function. The conductive core body 408 is electrically connected to the oscillation circuit 405 through the signal line 407. Further, the pen pressure detector 406 is electrically connected to the oscillation circuit 405.

The oscillation circuit 405 generates a signal whose frequency changes according to the capacitance of a variable capacitor of the pen pressure detector 406 and supplies the generated signal to the core body 408 through the signal line 407. The signal from the oscillation circuit 405 radiates, as an electric field based on the signal, from a pen tip (front end) of the core body 408. The oscillation circuit 405 includes, for example, an inductor/capacitor (LC) oscillation circuit that utilizes the resonance of the coil and the capacitor. The position detection device that detects the coordinate position indicated by the active capacitance pen 400 according to this example can obtain a pen pressure applied to the pen tip of the core body 408 in reference to the frequency of this signal.

The voltage conversion circuit 403 converts the voltage accumulated in the electric double layer capacitor 401 into a constant voltage and supplies the constant voltage as a power source for the oscillation circuit 405. When the active capacitance pen 400 of the capacitance system according to this example is attached to an unillustrated charger, an alternating magnetic field generated by the charger generates an induced electromotive force in the coil 404, thereby charging the electric double layer capacitor 401 through the rectifying diode 402.

In the active capacitance pen 400 configured as described above, a ferrite core configured in a similar manner to the ferrite core 212 described above is disposed around the core body 408, and the coil 404 for charging is disposed in a middle portion of the ferrite core. Accordingly, the active capacitance pen 400 can be configured without the outside diameter of the portion including the ferrite core and the coil 404 being increased.

Advantageous Effects of Embodiment

In the electronic pen 2 according to the embodiment described above, the outside diameter of the middle portion 212M is smaller than the outside diameters of the front portion 212F and the back portion 212B, and the coil 211 is formed in the middle portion 212M, so that the entire ferrite core 212 portion can be made thinner. This configuration can make the entire electronic pen body 21 thinner, making the electronic pen 2 itself thinner. Specifically, the outside diameter of the electronic pen body 21 can be substantially 2.3 mm, which is the same as the 4C standard for ballpoint pen refills. This makes it possible to realize a thinner electronic pen that can easily be stored in a housing of a mobile device. Further, the thinned electronic pen having an outside diameter of substantially 2.3 mm, which is the same as the 4C standard for ballpoint pen refills, can be used as an electronic pen refill, so that an electronic pen function can easily be mounted as one of functions of a multifunctional pen.

Further, since the coil 211 can be formed closer to the pen tip side of the ferrite core 212, the inductance can be increased. This configuration can widen the magnetic flux distribution on the pen tip side of the electronic pen 2. In other words, the coil 211 can generate a satisfactory magnetic flux (magnetic field) on the pen tip side of the electronic pen 2. As a result, in the case of the electronic pen of the electromagnetic coupling system, position indication and pen pressure can appropriately be transmitted to the position detection sensor 12 and the position detection device 13. Moreover, in the case of the electronic pen of the capacitance system, the electric double layer capacitor can efficiently be charged.

Modifications

The sizes of the coil 211, the ferrite core 212, the reinforcement pipe 213, and the core body 214 described in the embodiment above are merely examples and are not limited to these sizes. For example, it is possible to provide the middle portion 212M of the ferrite core 212 closer to the pen tip side, thereby forming the coil 211 closer to the pen tip side. That is, the lengths of the front portion 212F, the middle portion 212M, and the back portion 212B of the ferrite core 212 in the axial direction can vary. In the case of the electronic pen 2 according to the embodiment described above, since the portion where the coil 211 is formed does not become thick, the portion where the coil 211 is formed can also protrude from the housing 20 of the electronic pen 2. That is, it is possible to make the electromagnetic coupling with the position detection device 13 stronger.

In the case of the electronic pen body 21 described above, in order to make the outside diameter of the portion where the coil 211 is formed substantially 2.3 mm or less, the coil 211 is formed by the insulated conductor being wound around the middle portion 212M doubly (two stages). However, if the outside diameter of the portion where the coil 211 is formed is not required to be substantially 2.3 mm or less, the coil may be formed by the insulated conductor being wound around the middle portion 212M triply (three stages). Increasing the number of stages of the coil allows windings of the insulated conductor to be in close contact with each other and the chain of magnetic flux to increase. This increases the self-inductance (L value) and generates magnetic flux (magnetic field) satisfactorily.

Further, when the strength of the ferrite core 212 and the core body 214 is high, it is possible not to provide the reinforcement pipe 213. In the embodiment described above, the ferrite core is used as the magnetic core. However, the present disclosure is not limited thereto. When a core material that realizes the functions equivalent to those of a ferrite core can be realized with use of various magnetic materials, this core material may be used.

It is to be noted that the embodiment of the present disclosure is not limited to the foregoing embodiment, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic pen main body which communicates with a position detection sensor through electromagnetic induction, the electronic pen main body comprising:
a coil;
a columnar magnetic core including a through hole in an axial direction of the magnetic core;
a capacitor constituting a resonant circuit together with the coil; and
a rod-shaped core body inserted through the through hole of the magnetic core,
wherein the magnetic core includes:
a front portion in a predetermined range from a front end of the magnetic core on a pen tip side of the magnetic core toward a back end of the magnetic core on a side of the magnetic core opposite to the pen tip side of the magnetic core,
a back portion in a predetermined range from the back end of the magnetic core toward the front end of the magnetic core, and
a middle portion interposed between the front portion and the back portion,
wherein an outside diameter of the middle portion of the magnetic core is smaller than an outside diameter of the front portion of the magnetic core and an outside diameter of the back portion of the magnetic core, and
wherein the coil is wound around the middle portion of the magnetic core.

2. The electronic pen main body according to claim 1, wherein the middle portion of the magnetic core is a wound portion around which the coil is wound, and the front portion of the magnetic core and the back portion of the magnetic core are non-wound portions where the coil is not wound, and wherein an outside diameter of the wound portion around which the coil is wound is equal to or less than outside diameters of the non-wound portions.

3. The electronic pen main body according to claim 1, wherein the pen tip side of the front portion of the magnetic core gradually tapers and forms a tapered portion.

4. The electronic pen main body according to claim 1, wherein a side surface of the back portion of the magnetic core includes a groove along the axial direction of the magnetic core through which an insulated conductor from the coil wound around the middle portion of the magnetic core extends toward the back end of the magnetic core.

5. The electronic pen main body according to claim 1, further comprising:

a reinforcement pipe fixed from a first end of the through hole of the magnetic core to a second end of the through hole of the magnetic core, a front end of the reinforcement pipe protruding from an opening at the front end of the magnetic core, wherein the core body is movable in a sliding manner in the axial direction of the magnetic core in the reinforcement pipe.

6. The electronic pen main body according to claim 1, wherein a length of the middle portion of the magnetic core in the axial direction of the magnetic core is equal to a sum of a length of the front portion of the magnetic core in the axial direction of the magnetic core and a length of the back portion of the magnetic core in the axial direction of the magnetic core.

7. The electronic pen main body according to claim 1, wherein a length of the middle portion of the magnetic core in the axial direction of the magnetic core is equal to a sum of a length of the front portion of the magnetic core in the axial direction of the magnetic core and a length of the back portion of the magnetic core in the axial direction of the magnetic core, and wherein the length of the front portion in the axial direction of the magnetic core is greater than the length of the back portion in the axial direction of the magnetic core.

8. An electronic pen comprising:

a housing; and an electronic pen body in the housing, wherein the electronic pen body includes:

a coil;

a columnar magnetic core including a through hole in an axial direction of the magnetic core;

a capacitor constituting a resonant circuit together with the coil; and a rod-shaped core body inserted through the through hole of the magnetic core, wherein the magnetic core includes:

a front portion in a predetermined range from a front end of the magnetic core on a pen tip side of the magnetic core toward a back end of the magnetic core on a side of the magnetic core opposite to the pen tip side of the magnetic core, a back portion in a predetermined range from the back end of the magnetic core toward the front end of the magnetic core, and a middle portion interposed between the front portion and the back portion, wherein an outside diameter of the middle portion of the magnetic core is smaller than an outside diameter of the front portion of the magnetic core and an outside diameter of the back portion of the magnetic core, and wherein the coil is wound around the middle portion of the magnetic core, and wherein the electronic pen, in operation, is in a state in which at least part of the front portion of the magnetic core and a pen tip of the core body protrude from the housing.

* * * * *